June 20, 1950 — W. H. WEDGER — 2,512,003
STIFFENING PORTIONS OF THE UPPERS OF SHOES
Original Filed April 14, 1941
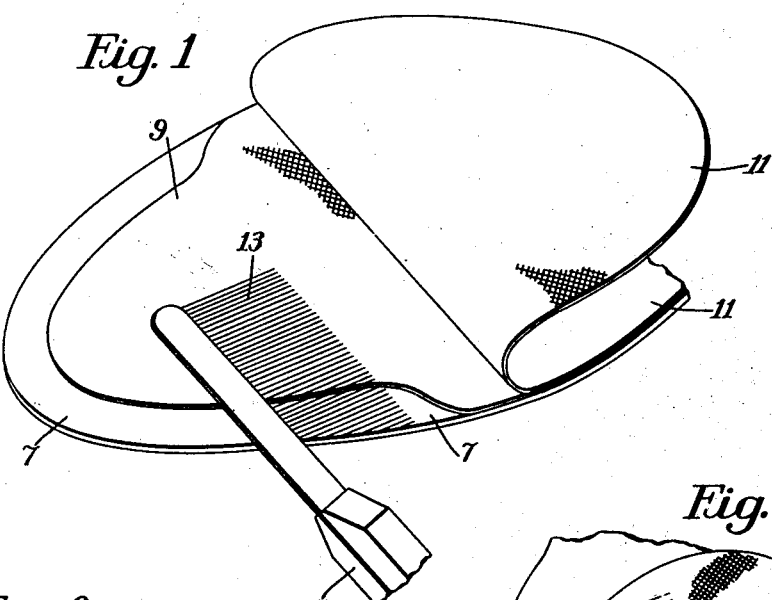
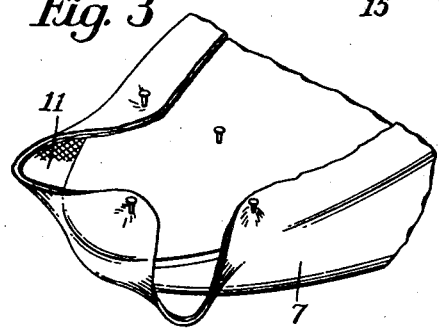
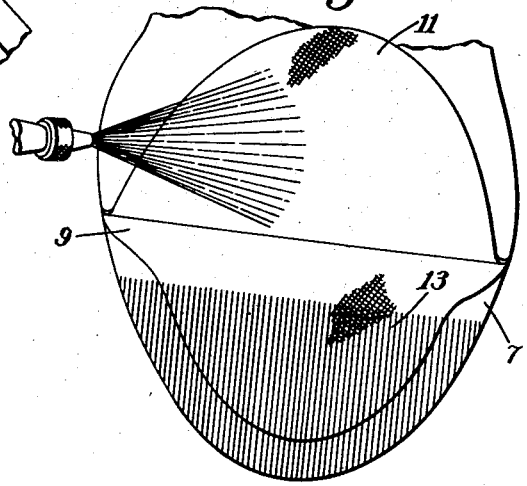
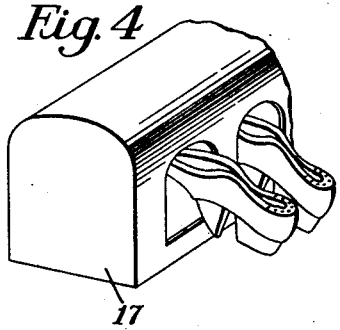
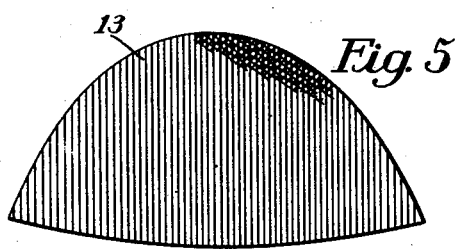
Inventor
Walter H. Wedger
By his Attorney Patented June 20, 1950

2,512,003

UNITED STATES PATENT OFFICE 2,512,003

STIFFENING PORTIONS OF THE UPPERS OF SHOES

Walter H. Wedger, Newton, Mass., assignor to United Shoe Machinery Corporation, Flemington, N. J., a corporation of New Jersey Original application April 14, 1941, Serial No. 388,398, now Patent No. 2,424,869, dated July 29, 1947. Divided and this application July 2, 1947, Serial No. 758,677

4 Claims. (Cl. 36—77)

This invention relates to the manufacture of boots and shoes and more particularly to the stiffening of certain parts of the upper, for example the toe portion.

In the manufacture of a shoe, it is common to stiffen the toe portion of the upper, by means of a stiffener blank impregnated with a stiffening substance such as Celluloid, paste, rosin, etc., such a stiffener being softened by a solvent or by heat to render it pliable before it is placed in the upper of a shoe and conformed, together with the upper, to the last.

According to the present invention the stiffening of a selected portion of an upper is accomplished by bringing together a stiffening layer which is flexible and lastable and a curing agent which is operative to convert the stiffening to a condition in which it is not only hard but cured and resistant to water. The upper is conformed to the last while the stiffening layer is in uncured or only partially cured condition and is maintained upon the last until the curing agent acts in the layer to cure it and develop in it stiffness capable of retaining the shoe in its lasted form.

The hardenable layer comprises resins which remain relatively soft in their uncured or partially cured form until brought into contact with a curing agent during shoemaking, the resins being convertible through the action of the agent into a stronger and harder form in which they are stiff and insoluble.

Aminoplast stiffening substances are suitable resinous substances for use in my method. The term "aminoplast stiffening substance," as used herein, denotes a product which results from the partial reaction of a substance containing an $NH_2$ group linked to carbon, such as urea, thiourea, melamine, dicyandiamide and derivatives of these substances with an aldehyde, the product, upon being acidified, being capable of curing to a hard, water-resistant resin. In the preparation of such aminoplast stiffening substances, the partial reaction is one of addition or addition plus partial condensation polymerization. After the addition reaction, the products may be stabilized and used as such. Alternatively, the addition products may be partially polymerized and then stabilized. In the final cure the addition products, or the partially polymerized products, are polymerized or condensed to a hard, water-resistant resin. The aminoplast stiffening substance may be any one of such partial reaction products or a mixture of any of them.

When the reaction between the compound containing the $NH_2$ group and the aldehyde is stopped, the partial reaction product is water-soluble, and in the case of the ureas the solution can readily be stabilized by adjusting the pH value. The solution of the melamine partial reaction product is not so readily stabilized; and commonly this partial reaction product is sold in the form of a stable water-soluble powder, a suitable product being put out by the American Cyanamid Company under the trade name of "Melmac S-77 V." The solution of the dicyandiamide partial reaction product is also not readily stabilized. In the case of any of the substances mentioned above, the reaction with the aldehyde may be carried to a point in which the partial reaction product is either considerably less soluble or is insoluble in water, and, provided that the reaction has not been carried too far, the product will still be usable in the manner in which a solution is used as described in detail below. Alternatively, if the partial reaction products are not readily available, they may be made in a known manner by reacting urea, melamine, etc. with an aldehyde. The methods by which these partial reaction products are made form no part of the present invention which is concerned entirely with said products.

A preferred material, which is put out by the American Cyanamid Company under the trade name of "Beetle Syrup No. 250 conc.," an aqueous solution of the partial reaction product of urea and formaldehyde containing 70% solids and having a pH value of about 7, is in a convenient form to be used; and the other partial reaction products may readily be made into a solution or suspension or a combination of the two having the same solid content. In the further description of the invention, including the formulas, such a solution or suspension of an aminoplast stiffening substance will be referred to as "resin syrup."

According to a preferred procedure, there is prepared a stiffening substance comprising an uncured resin. For example a solution or syrup of an uncured aminoplast stiffening substance may be combined with a toughening substance such as emulsified nitrocellulose and with a filler which may be a protein, e. g. ground hair, to form a pasty mass. The stiffening substance may be incorporated in a separate stiffener blank for insertion in the upper of a shoe or may be applied to a selected locality of the upper of a shoe, for example the toe portion of one or another of the layers of the laminated upper of a shoe. The flexible and lastable stiffener-containing blank or layer thus obtained is then treated by supplying on it, or in a layer adjacent to it, a curing agent which will harden the stiffening substance and convert it to a cured, water-resistant condition. The upper is conformed to the last while the stiffening substance is in its uncured form and is maintained upon the last until the substance has become cured to a stiff, water-resistant form. The cured, stiffened layer or blank operates to stiffen the selected locality of the upper and resiliently retain it in its lasted shape.

Referring to the accompanying drawing:

Fig. 1 is a perspective of a portion of the toe end of the upper of a shoe, the stiffening material being in process of being applied to the toe portion of the doubler by means of a spatula;

Fig. 2 is a plan of the same portion of the upper showing the application of the curing agent in the form of a spray;

Fig. 3 is a perspective of the toe portion of the upper after it has been pulled over;

Fig. 4 is a perspective of a toe heater showing two lasted shoes in process of having their toe portions heated to hasten the curing and drying of the stiffening material; and Fig. 5 is a plan of a toe stiffener blank to which the stiffening material has been applied.

The resin syrup, which is in its intermediate uncured stage, is preferably mixed with a filler, an alkali and a toughening agent to form the stiffening material ready to be applied to a shoe part. An example of a suitable stiffening material is as follows:

| | Parts by weight |
|---|---|
| Resin syrup (70% solids) | 200 |
| Triethanolamine | 4 |
| Nitrocellulose emulsion | 120 |
| Ground horse hair | 75 |

The first three substances are mixed together and then the filler is mixed in. The ground horse hair imparts resilience to the stiffening material in its finished cured form. The alkali is a stabilizer and neutralizes to the desired degree the acidity of the filler. The nitrocellulose is a toughening agent which increases the flexibility of the cured resin.

The nitrocellulose emulsion may be made by first preparing two solutions as follows:

No. 1

| | Av. oz. |
|---|---|
| Film scrap solution (15% solids) | 17 |
| Dibutyl phthalate | 1 |

No. 2

| | Fl. oz. |
|---|---|
| Methyl cellulose solution (2½% solids) | 2 |
| Duponol solution | 10 |

The Duponol solution consists of 21 grams Duponol M. E. Dry and 1 fluid ounce sulphonated castor oil (monopole) made up to one gallon with water. Nos. 1 and 2 are mixed and put through a homogenizer. The nitrocellulose emulsion need not be made separately. If desired the proper amounts of Nos. 1 and 2 above may be mixed with the resin syrup and put through a homogenizer; or the nitrocellulose may be dissolved in a solvent which is not miscible with water and the solution stirred into the resin syrup and the whole put through a homogenizer, water being added if desired to adjust the solid content. In any case, however, a nitrocellulose emulsion results; and the stiffening material ready to be used to impregnate or coat a shoe part is a thick, sticky, pasty mass.

Although the preferred ingredients of the stiffening material have been named above by way of illustration, it should be understood that various substitutions of ingredients which have the same or similar properties may be made. Examples of such substitutions are as follows. As toughening substance there may be used other plastic, amorphous, film-forming substances such as polyvinyl acetate, ethyl cellulose, asphalt, cellulose acetate, chlorinated rubber, and n-butyl methacrylate. As stabilizer there may be used trisodium phosphate, sodium borate and piperidine. As filler there may be used finely divided, inert substances such as various kinds of ground hair, leather dust, ground slate, walnut shell flour, cellulose, and finely divided asbestos.

As toughening agents there may also be used, either in place of the nitrocellulose or with it, certain substances such, for example, as polymerized ethylene oxide of a molecular weight of from 1500 to 4000 or an alkyd resin such as an oil-modified reaction product of phthalic anhydride and glycerine.

An example of a suitable stiffening material containing this mixture of alkyd resin and aminoplast stiffening substance is as follows:

| | Parts by weight |
|---|---|
| Mixture of alkyd resin solution and aminoplast resin syrup | 200 |
| Triethanolamine | 4 |
| Water | 40 |
| Ground horse hair | 75 |

In making the mixture of alkyd resin and aminoplast resin syrup, a solution of the alkyd resin in a solvent such as toluol is stirred into the resin syrup and water to emulsify the alkyd resin, and then the pH value is adjusted to make the mixture properly alkaline.

As has been stated, nitrocellulose emulsion may also be used if desired. An example is as follows:

| | Parts by weight |
|---|---|
| Mixture of alkyd resin and aminoplast resin syrup | 200 |
| Nitrocellulose emulsion | 120 |
| Triethanolamine | 4 |
| Ground horse hair | 75 |

Here the alkyd resin is emulsified when it is stirred into the aminoplast resin syrup and the nitrocellulose emulsion.

Examples of suitable formulas which include polymerized ethylene oxide, a water-soluble substance, are as follows:

| | Parts by weight |
|---|---|
| Resin syrup (70% solids) | 200 |
| Polymerized ethylene oxide | 50 |
| Triethanolamine | 4 |
| Ground horse hair | 75 |

| | |
|---|---|
| Resin syrup (70% solids) | 200 |
| Polymerized ethylene oxide | 50 |
| Nitrocellulose emulsion | 120 |
| Triethanolamine | 4 |
| Ground horse hair | 75 |

The pasty stiffening material is applied to a selected portion of the upper of a shoe, for example to the toe portion of the doubler. An agent which will cause the stiffening substance to cure upon standing or more quickly upon being heated is then applied to the stiffening material or provided in a layer adjacent to it. A suitable agent for curing aminoplast stiffening substances is an aqueous solution of an ammonium salt, such as ammonium chloride, which reduces the pH value of the substance.

The method of stiffening the toe portion of the upper may be carried out in different ways, depending to some extent upon the construction of the upper itself. Ordinarily, an upper comprises an outer or display part and an inner or hidden part, the latter part consisting sometimes of a lining only but usually of a lining and a doubler. Assuming that the assembled upper comprises a vamp 7, a doubler 9 and a lining 11, the stiffening material 13 is forced into and through the doubler, which may have its margin cut away as shown, so that, when the toe portion is lasted, there will not be surplus material to form objectionable bunches or wrinkles. The upper, at this time, may be already assembled together with an insole upon a last. The forcing of the stiffening material into and through the doubler may be accomplished in any convenient manner. For example, this may be accomplished by placing the toe portion of the upper upon a flat support with the vamp down and the toe portion of the lining pulled back, as shown in Fig. 1, and forcing the pasty stiffening material 13 into and through the doubler by means of a spatula 15. The application of the stiffening material in this manner causes it to impregnate the doubler thoroughly and to cause some of the material to pass through the doubler. Consequently, when the upper is pulled over and lasted, the toe portion of the vamp, the doubler and the lining are thoroughly bonded together. The curing agent may be applied, as shown in Fig. 2, by spraying a solution of a substance such as ammonium chloride upon the liner and the exposed margin of the vamp, if the margin of the doubler has been cut away.

Conveniently, the application of the curing agent and the application of the resinous stiffening material will be made just before the pulling over operation by which the conforming of the upper to the last is initiated as shown in Fig. 3, the final conforming of the upper taking place during the subsequent lasting operation. The toe portion of the doubler, treated with the resinous pasty mass described above, which is in contact with the curing agent, will remain workable during the time which elapses in common shoe-factory practice until the shoe is lasted. After the lasting operation, the toe portion of the lasted shoe is subjected to heat for an interval, for example in a heater 17 as shown in Fig. 4, to hasten the drying and the cure of the stiffening substance. There results a stiffened toe position of the upper which is hard, resilient and water-resistant.

This hastening of the cure of the stiffening substance is desirable for several reasons. It permits the last to be removed as soon as desired. It prevents the hold-downs or other members of machines, which engage the top of the forepart of the upper and apply pressure to it, from marking the upper as they might do if the stiffening substance were soft. Moreover, in the lasting of a shoe there are commonly formed wrinkles in the toe portion which must be later ironed out. The shrinking of the stiffening substance tends to remove these wrinkles; and this shrinking effect is greater in the case in which the toe portion is heated to cure the substance and to drive out the water quickly.

In shoes which have no doubler the lining is sometimes a fairly heavy fabric with a napped side which is adjacent to the leather upper. In such case the stiffening material may be applied to the napped side of the lining without causing difficulty by striking through the lining sufficiently to cause the lining to adhere to the last. If the lining has not sufficient body to hold the stiffening material without danger of having it strike through, a tip-doubler of fabric may be used between the toe portion of the lining and the leather upper, or some sort of protective substance such, for example, as powdered chalk may be applied to the toe portion of the last to prevent the lining from sticking to the last.

The stiffening material and the curing agent may be incorporated in the assembled upper in various manners. As has been stated, the preferred manner is to incorporate both in the doubler or in two adjacent layers. It is possible, however, to make use of a separate blank which is inserted between layers of the upper, in which case the blank may carry both the stiffening material and the curing agent or only one of these two substances. In the latter case, the other of the two substances will be carried by a layer of the upper. In Fig. 5 there is shown a toe-stiffener blank comprising a porous fabric impregnated with the pasty stiffening material 13. The blank is treated with a curing agent, immediately inserted in the toe portion of an assembled upper, and the manufacture of the shoe proceeded with, as has been described above, including the pulling over and lasting operations and the heating of the toe portion of the lasted shoe to hasten the drying and curing of the stiffening substance.

Although the invention has been set forth in connection with the stiffening of the toe portion of a shoe, it should be understood that the invention is not limited to the stiffening of any particular portion of the upper.

This application is a division of my copending application, Serial No. 388,398, filed April 14, 1941, now United States Patent No. 2,424,869, issued on July 29, 1947.

Having thus described my invention, what I claim as new and desire to secure by Letters Patent of the United States is:

1. The method of stiffening a portion of the upper of a shoe which comprises associating in said portion of the upper a flexible, lastable layer comprising a hardenable resin and a second layer adjacent to said first layer comprising a curing agent for the resin adapted to convert the resin to a stiff, water-resistant condition, shaping said portion of the upper of the shoe, and maintaining the portion in its shaped condition until the hardenable resin is cured.

2. The method of stiffening a portion of the upper of a shoe which comprises associating in said portion of the upper a flexible, lastable layer comprising a hardenable resin and a layer of the upper adjacent to said first-mentioned layer carrying a curing agent for the resin, said curing agent being adapted to convert the hardenable resin to a hard, water-resistant condition, said layer comprising a hardenable resin being carried by a separate blank, shaping said portion of the upper of a shoe, and maintaining the portion in its shaped condition until said hardenable resin is cured.

3. A flexible stiffener comprising a porous, absorbent, fibrous base impregnated with a hardenable resin in uncured condition and having a layer comprising a curing agent adjacent said resin and adapted to convert the resin to a hard, water-resistant condition.

4. A stiffener as defined in claim 3 wherein the fibrous base is impregnated with an uncured aminoplast stiffening substance.

WALTER H. WEDGER.

REFERENCES CITED

The following references are of record in the file of this patent:

UNITED STATES PATENTS

| Number | Name | Date |
|---|---|---|
| 2,277,941 | Almy | Mar. 31, 1942 |
| 2,340,591 | Hofferbert | Feb. 1, 1944 |
| 2,424,869 | Wedger | July 29, 1947 |